US012023535B2

(12) United States Patent
Zhang et al.

(10) Patent No.: US 12,023,535 B2
(45) Date of Patent: Jul. 2, 2024

(54) AQUEOUS FIRE EXTINGUISHING AGENT AND PREPARATION METHOD THEREOF

(71) Applicant: Nan Chang Hang Kong University, Nanchang (CN)

(72) Inventors: Jun Zhang, Nan Chang (CN); Junxiong Chen, Nanchang (CN); Zixuan Xie, Nanchang (CN); Zhiao Li, Yichun (CN); Jingheng Nie, Fengcheng (CN); Shuyu Chen, Ji'an (CN); Peipei Li, Fuzhou (CN); Haitao Ding, Yexian County (CN)

(73) Assignee: Nan Chang Hang Kong University, Nanchang (CN)

( * ) Notice: Subject to any disclaimer, the term of this patent is extended or adjusted under 35 U.S.C. 154(b) by 485 days.

(21) Appl. No.: 17/412,763

(22) Filed: Aug. 26, 2021

(65) Prior Publication Data

US 2022/0184436 A1 Jun. 16, 2022

(30) Foreign Application Priority Data

Dec. 10, 2020 (CN) ......................... 202011432554.0

(51) Int. Cl.

| | |
|---|---|
| ***A62C 5/00*** | (2006.01) |
| ***A62C 19/00*** | (2006.01) |
| ***A62D 1/00*** | (2006.01) |
| ***A62D 1/06*** | (2006.01) |

(52) U.S. Cl.

CPC .............. *A62C 5/008* (2013.01); *A62C 19/00* (2013.01); *A62D 1/0042* (2013.01); *A62D 1/06* (2013.01)

(58) Field of Classification Search

CPC ...... A62C 5/008; A62C 19/00; A62D 1/0042; A62D 1/06

See application file for complete search history.

(56) References Cited

U.S. PATENT DOCUMENTS

2021/0331017 A1* 10/2021 Dale .................... A62D 1/0078

FOREIGN PATENT DOCUMENTS

CN 108421197 A 8/2018
CN 111450463 A 7/2020

* cited by examiner

*Primary Examiner* — Andrew J. Oyer

(57) ABSTRACT

An aqueous fire extinguishing agent and a preparation method thereof are provided, which are used for making a throw-type fire extinguisher. The aqueous fire extinguishing agent is composed of two compositions of A and B. The composition A is a fortified water added with a flame retardant (e.g., one or more of ammonium chloride, diammonium hydrogen phosphate and ammonium polyphosphate), a wetting agent (e.g., alkyl polyglycoside) and a colloid (e.g., polyacrylamide solution). The composition B is a regulator. After the composition A and the composition B are mixed, a discharge rate/speed of fire extinguishing substances is increased, so that an escape passage/route can be opened up quickly.

3 Claims, No Drawings

AQUEOUS FIRE EXTINGUISHING AGENT AND PREPARATION METHOD THEREOF

FIELD OF THE DISCLOSURE

The disclosure relates to the field of fire extinguishing agent technologies, and more particularly to an aqueous fire extinguishing agent and a preparation method thereof, and the aqueous fire extinguishing agent is applicable to throw-type fire extinguishers.

BACKGROUND OF THE DISCLOSURE

In case of encountering fire hazards, in order to open up escape passages, people often use throw-type fire extinguishers to open up escape routes. For example, Chinese patent application No. 97104877.0 (corresponding to publication No. CN1092072C) discloses a hand throw-type extinguishing liquid bomb. The throw-type extinguishing liquid bomb includes a mixture of ammonium chloride, ammonium bicarbonate, potassium carbonate, diammonium hydrogen phosphate and sodium tungstate dissolved in an appropriate amount of water, a specific gravity of the resulting solution is 1.290, and a pH value is in a range of 7.5~10.0. Firstly, the pH value of the throw-type extinguishing liquid bomb is in the range of 7.5~10.0, which exceeds provision/specification in table 4.1 of GB17835-1999 of China general technical conditions for water-based fire extinguishing agents. Secondly, the higher the pH value, the higher a molar ratio of free ammonia in the aqueous solution at room temperature. For example, the free ammonia in the aqueous solution with a pH value of 10 accounts for about 90% at 30° C., and a mechanical stirring is required when the solution is prepared, so that ammonia escaped after the stirring would reduce effective components of a fire extinguishing agent. On the other hand, the free ammonia in the aqueous solution with a pH value of 7 accounts for about 10% under the same temperature condition, and there is little escape when the fire extinguishing agent is prepared.

SUMMARY OF THE DISCLOSURE

In view of the related art, an objective of the disclosure is to provide an aqueous fire extinguishing agent (also referred to as water-based fire extinguishing agent), which is divided into a composition A (e.g., fortified water) and a composition B (e.g., regulator). When the composition A is prepared, a ratio of ingredients is controlled so that a pH value of a prepared solution is in a range of 7.0~7.5, a proportion of an ammonium salt is high, and effective components of the composition A are not easy to escape under a mechanical stirring during preparation. Moreover, when the fire extinguishing agent is filled, the composition A is injected first, then the composition B is injected and a sealing is performed immediately after the composition B is injected to obtain a working fluid with a mixture of the composition A and the composition B, and a pH value of the working fluid is about 9.0. Alternatively, the composition A and the composition B are mixed through a device in a fire extinguisher to obtain a working fluid when the fire extinguisher is in use. In addition, when the working fluid with a pH value of 9.0 is at the temperature of 60° C., a proportion of free ammonia exceeds 80%, the large amount of ammonia escaped resulting from heating would speed up a fire extinguishing speed and improve a fire extinguishing efficiency. In each production batch, the composition A is titrated by the composition B to ensure the ratio of the composition A to the composition B in the fire extinguisher, so that the pH value of the working fluid is close to 9.0. Meanwhile, a wetting agent and a colloid play roles of penetration, water retention and inhibition of the fire extinguishing agent to thereby help prevent the spread of fire. The formula has a low toxicity and is environmentally friendly.

The disclosure may be realized by adopting the following technical solutions.

Specifically, an aqueous fire extinguishing agent may include a composition A and a composition B. The composition A is a fortified water added with a flame retardant, a wetting agent and a colloid, and the composition B is a regulator. The flame retardant of the composition A is one or more selected from the group consisting of carbonamide $CH_4N_2O$, ammonium chloride $NH_4Cl$, diammonium hydrogen phosphate $(NH_4)_2HPO_4$ and ammonium polyphosphate $(NH_4)_n$+$2P_nO_{3n+1}$, the wetting agent is an alkyl polyglycoside APG0810, and the colloid is a polyacrylamide PAM solution. The composition B is a sodium hydroxide NaOH solution. A working fluid for fire extinguishing is a mixture of the composition A and the composition B.

In an embodiment, a value of polymerization degree n of the ammonium polyphosphate $(NH_4)_n$+$2P_nO_{3n+1}$ is 10~20.

In another embodiment, a preparation method of the above-mentioned aqueous fire extinguishing agent may include the following steps:

step (1), preparing a composition A: injecting 1000 milliliters (ml) of deionized water into a preparation vessel, placing the preparation vessel into a water bath device, keeping a water temperature at 20~40° C., adding 0~1000 g of carbonamide $CH_4N_2O$, 0~410 g of ammonium chloride $NH_4Cl$, 0~720 g of diammonium hydrogen phosphate $(NH_4)_2$ $HPO_4$ and 0~200 g of ammonium polyphosphate $(NH_4)_n$+$2P_nO_{3n+1}$ into the preparation vessel under stirring, then adding 0.1~10 ml of alkyl polyglycoside APG0810 with a solid content no less than 50% and 0.1~100 ml of polyacrylamide PAM solution with concentration of 1~5‰, continuing to inject deionized water until a volume of an aqueous solution in the preparation vessel is up to 2000 ml, stirring the aqueous solution for complete dissolution, and a pH value of the aqueous solution is in a range of 6~8.

step (2), preparing a composition B: preparing a sodium hydroxide solution of composition B with a concentration of 0.1~55%.

step (3), performing a titration test: taking a part of the composition A prepared by the step (1) and using the composition B prepared by the step (2) for titration, completing the titration test when a pH value of a working fluid mixed with the composition B and the composition A is in a range of 8.0~9.0, and recording a dosage ratio of the composition A and the composition B.

step (4), filling a fire extinguishing agent: injecting the composition A first and then injecting the composition B and sealing to obtain a working fluid with a mixture of the composition A and the composition B according to the dosage ratio of the composition A and the composition B obtained in the step (3); or, obtaining a working fluid by mixing the composition A and the composition B through a device in a fire extinguisher when the fire extinguisher is in use.

Further, the step (3) may include: measuring the part of the composition A by a volumetric flask, pouring the measured composition A into a beaker, inserting a calibrated pH meter, adding the composition B dropwise by a burette while stirring, stopping the titration when a pH value measured by the pH meter is in the range of 8.0~9.0, reading a dropping amount of the composition B from the burette, and recording the dosage ratio of the composition A and the composition B.

Compared with the prior art, the embodiments of the disclosure may mainly have the following beneficial effects or advantages.

(1) the fire extinguishing agent is divided into the composition A (e.g., fortified water) and the composition B (e.g., regulator). When the composition A is prepared, a ratio of ingredients/components is controlled so that the pH value of the solution of the composition A is in the range of 7~7.5, and the proportion of ammonium salt is high. The effective components of the composition A are not easy to escape under the mechanical stirring during preparation.

(2) the pH value of the working fluid as mixed is about 9 when the composition A and the composition B are injected into the fire extinguisher, and the proportion of free ammonia is large. The ammonia escaped in case of encountering fire participates in blocking a combustion chain, thereby accelerating a fire extinguishing speed and improving a fire extinguishing efficiency, which can quickly open up escape passages and effectively prevent the spread of fire.

(3) the wetting agent in the fire extinguishing agent can penetrate into a deep part of wood, and a probability of reburning is greatly reduced. The fortified water has significant fire extinguishing effect on plastic combustibles with poor wetting effect; the added colloid can reduce a loss of water, and can achieve two effects of water retention and flame retardant.

(4) the wetting agent and the colloid in the fire extinguishing agent formula play roles of penetration, water retention and inhibition of the fire extinguishing agent to thereby help prevent the spread of fire. Moreover, the formula has a low toxicity and is environmentally friendly.

DETAILED DESCRIPTION OF EMBODIMENTS

The technical scheme of the disclosure is further described in detail below in combination with illustrated embodiments.

Embodiment 1

(1) A composition A is prepared according to the following proportions and methods:

a preparation vessel is injected with 1000 milliliters (ml) of deionized water and is placed in a water bath device, and a water temperature is kept at 20~30° C. Under stirring, 240 grams (g) of carbonamide $CH_4N_2O$ is added into the preparation vessel until completely is dissolved, 160 g of ammonium chloride $NH_4Cl$ is added into the preparation vessel until completely is dissolved, 264 g of diammonium hydrogen phosphate $(NH_4)_2HPO_4$ is added into the preparation vessel until completely is dissolved. 1 ml of alkyl polyglycoside APG0810 and 10 ml of polyacrylamide PAM solution with a concentration of 1‰ are then added. Afterwards, 11 g ammonium polyphosphate $(NH_4)_n$+$2P_nO_{3n+1}$ with polymerization degree of 10 continues to be added, deionized water is injected until a volume of an aqueous solution in the preparation vessel is up to 2000 ml, the aqueous solution is stirred for complete dissolution, and a pH value of the aqueous solution is measured to be 7.27.

(2) a composition B is prepared. Specifically, 100 ml of water is taken, and 50 g of sodium hydroxide NaOH is added and stirred until the sodium hydroxide NaOH is completely dissolved.

(3) a titration test is performed. Specifically, 100 ml of the composition A is measured by a volumetric flask, the measured composition A is poured into a beaker, a sensor of a calibrated pH meter is inserted, a pH value measured by the pH meter is 7.27; subsequently, the composition B is added dropwise by an alkali or acid burette while stirring, the titration is stopped when a pH value measured by the pH meter is about 9, and a dropping amount of the composition B read from the burette is about 4.8 ml.

(4) a fire extinguisher tank with a volume of 600 ml is taken, 500 ml of the composition A is filled therein first, 24 ml of the composition B is then injected and a sealing is immediately carried out thereafter to thereby obtain a fire extinguisher.

Embodiment 2

(1) A composition A is prepared according to the following proportions and methods:

a preparation vessel is injected with 1000 milliliters (ml) of deionized water and is placed in a water bath device, and a water temperature is kept at 20~30° C. Under stirring, 240 grams (g) of carbonamide $CH_4N_2O$ is added into the preparation vessel until completely is dissolved, 160 g of ammonium chloride $NH_4Cl$ is added into the preparation vessel until completely is dissolved, 264 g of diammonium hydrogen phosphate $(NH_4)_2HPO_4$ is added into the preparation vessel until completely is dissolved. 1 ml of alkyl polyglycoside APG0810 and 10 ml of polyacrylamide PAM solution with a concentration of 1‰ are then added. Afterwards, 11 g ammonium polyphosphate $(NH_4)_n$+$2P_nO_{3n+1}$ with polymerization degree of 10 continues to be added, deionized water is injected until a volume of an aqueous solution in the preparation vessel is up to 2000 ml, the aqueous solution is stirred for complete dissolution, and a pH value of the aqueous solution is measured to be 7.27.

(2) a composition B is prepared. Specifically, 100 ml of water is taken, and 50 g of sodium hydroxide NaOH is added and stirred until the sodium hydroxide NaOH is completely dissolved.

(3) a titration test is performed. Specifically, 100 ml of the composition A is measured by a volumetric flask, the measured composition A is poured into a beaker, a sensor of a calibrated pH meter is inserted, a pH value measured by the pH meter is 7.27; subsequently, the composition B is added dropwise by an alkali or acid burette while stirring, the titration is stopped when a pH value measured by the pH meter is about 9, and a dropping amount of the composition B read from the burette is about 4.8 ml.

(4) a fire extinguisher with a volume of 600 ml is taken, and the fire extinguisher is installed a device containing 24 ml of the composition B therein. After the installation of the device, 500 ml of the composition A is filled into the fire extinguisher. The device containing the composition B in the fire extinguisher is destroyed before throwing the fire extinguisher, and the fire extinguisher is shaken for evenly mixing the composition B with the composition A and then is thrown out.

The above illustrated embodiments are only preferred embodiments of the disclosure and are only used to explain the disclosure rather than limit the disclosure. Any change, replacement, combination, simplification, modification, etc. made by those skilled in the related art without departing from a spiritual essence and principle of the disclosure shall be equivalent replacement methods and shall be included in a protection scope of the disclosure.

What is claimed is:

1. A preparation method of an aqueous fire extinguishing agent, the aqueous fire extinguishing agent comprising: a composition A and a composition B;

wherein the composition A is a fortified water added with a flame retardant, a wetting agent and a colloid, and the composition B is a regulator;

wherein the flame retardant of the composition A is one or more selected from the group consisting of carbonamide ($CH_4N_2O$), ammonium chloride ($NH_4Cl$), diammonium hydrogen phosphate ($(NH_4)_2HPO_4$) and ammonium polyphosphate ($(NH_4)_n$+$2P_nO_{3n+1}$), the wetting agent is APG0810, and the colloid is a polyacrylamide (PAM) solution;

wherein the composition B is a sodium hydroxide (NaOH) solution; and wherein a working fluid for fire extinguishing is a mixture of the composition A and the composition B.

wherein the preparation method of the aqueous fire extinguishing agent comprises:

step (1), preparing a composition A: injecting 1000 milliliters (ml) of deionized water into a preparation vessel, placing the preparation vessel into a water bath device, keeping a water temperature at 20~40° C., adding 0~1000 g of the carbonamide ($CH_4N_2O$), 0~410 g of ammonium chloride ($NH_4Cl$), 0~720 g of the diammonium hydrogen phosphate ($(NH_4)_2HPO_4$) and 0~200 g of the ammonium polyphosphate ($(NH_4)_n$+$2P_nO_{3n+1}$) into the preparation vessel under stirring then adding 0.1~10 ml of the APG0810 with a solid content no less than 50% and 0.1~100 ml of polyacrylamide (PAM) solution with a concentration of 1~5‰, continuing to inject deionized water until a volume of an aqueous solution in the preparation vessel is up to 2000 ml, stirring the aqueous solution for complete dissolution, and a pH value of the aqueous solution being in a range of 7.0~7.5;

step (2), preparing the composition B: preparing a sodium hydroxide solution with a concentration of 0.1~55%;

step (3), performing a titration test: taking a part of the composition A prepared by the step (1) and using the composition B prepared by the step (2) for titration, completing the titration test when a pH value of a working fluid mixed with the composition B and the composition A being 9.0 and recording a dosage ratio of the composition A and the composition B; and step (4), filling the aqueous fire extinguishing agent: injecting the composition A first and then injecting the composition B and sealing to obtain a working fluid with the mixture of the composition A and the composition B, according to the dosage ratio of the composition A and the composition B obtained in the step (3); or, obtaining the working fluid by mixing the composition A and the composition B through a device in a fire extinguisher when the fire extinguisher being in use.

2. The preparation method of the aqueous fire extinguishing agent according to claim 1, wherein a value of polymerization degree n of the ammonium polyphosphate ($(NH_4)_n$+$2P_nO_{3n+1}$) is 10~20.

3. The preparation method of an aqueous fire extinguishing agent according to claim 1, wherein the step (3) comprises:

measuring the part of the composition A by a volumetric flask, pouring the measured composition A into a beaker, inserting a calibrated pH meter into the beaker, adding the composition B dropwise by a burette while stirring, stopping the titration when a pH value measured by the pH meter is 9.0, reading a dropping amount of the composition B from the burette, and recording the dosage ratio of the composition A and the composition B.

* * * * *